Nov. 11, 1952     E. E. HANS     2,617,596
THERMOSTATICALLY CONTROLLED VALVE
Filed April 1, 1949
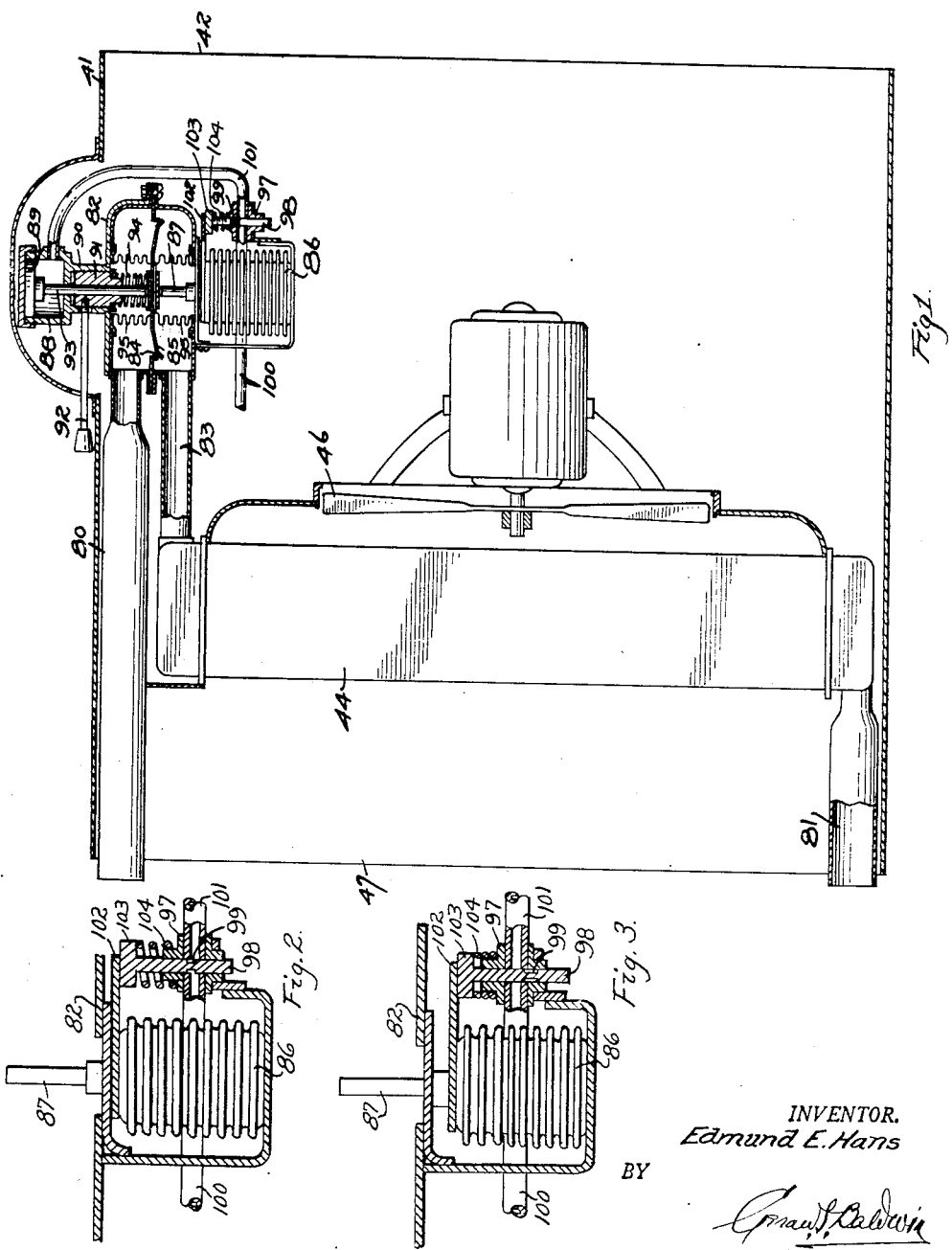
INVENTOR.
Edmund E. Hans
BY
ATTORNEY Patented Nov. 11, 1952

2,617,596

UNITED STATES PATENT OFFICE 2,617,596

THERMOSTATICALLY CONTROLLED VALVE

Edmund E. Hans, Detroit, Mich.

Application April 1, 1949, Serial No. 85,018

1 Claim. (Cl. 236—86)

This application, which is a continuation in part of Patent No. 2,476,295, issued on July 19, 1949, refers to improvements in thermostatic valves.

In heating equipment a thermostatic valve is often employed to regulate the admission of a heating medium into a radiator, and frequently after the temperature of the air by which the thermostat is influenced drops below the critical temperature there is a considerable time lag before the thermostat contracts sufficiently to open the valve. It is an object of this invention to provide a thermostatic valve wherein means are provided for reducing this time lag and rendering the valve more sensitive.

Another object of the invention is to provide a thermostatic valve wherein means are provided for exerting pressure against the valve and the thermostat in the valve opening direction both when the valve is shut and when it is partly open, so that at or about critical temperature the valve moves slowly on and off its seat.

A further object of the invention is to provide such a thermostatic valve wherein the means for exerting pressure against the valve in an opening direction is rendered inoperative when the valve is fully open.

Having thus briefly stated some of the objects and advantages of the invention I will now describe it in detail with the aid of the accompanying drawing, in which:

Figure 1 is a side view of the valve partly in section.

Figure 2 is an enlarged view showing the thermostat and a plunger axially moved thereby through a valve body. In this case the thermostat is fully expanded.

Figure 3 is a view similar to Figure 2 but showing the thermostat fully contracted and the valve plunger in corresponding position.

Referring to the drawing, 41 designates a tubular casing having a radiator 44 mounted therein through which air is discharged by a fan 46. Hot water from a suitable source (not shown) flows through an inlet pipe 80, a valve housing 82, and a pipe connection 83 into the radiator 44 whence it passes through a return line 81.

Provided in the housing 82 is an annular valve seat 84 the opening through which is adapted to be closed by a valve 85. Mounted on one side of the housing 82 is a thermostat 86 from the expansible extremity of which a spindle 87 projects which is adapted to bear against one side of the valve 85 and force the latter against its seat. Formed on the opposite side of the housing 82 integral with the latter and spaced outwardly therefrom by a sleeve 90 is a cylinder 88 having a piston 89 therein. The sleeve 90 is internally threaded and engages an externally threaded bushing 91 therein. Projecting radially through a slot formed in the sleeve 90 and secured to the bushing 91 is an operating handle 92 for turning the latter. Extending from the piston 89 through the bushing 91 is a rod 93 the outer extremity of which is adapted to move the valve 85 off its seat 84. Mounted around the rod 93 is a helical spring 94 resting at one extremity against the bushing 91 and at its opposite extremity against the valve 85 so that by rotation of the bushing the pressure which the thermostat 86 must exert to close the valve is either increased or decreased. Extending from opposite sides of the housing 82 to the adjacent sides of the valve 85 are bellows-like expansible sleeves 95 each of which is secured at one extremity to the housing and at its opposite extremity to one side of the valve. Thus one sleeve encloses the spring 94 and part of the rod 93 and prevents moisture in the housing reaching these parts, and the other sleeve encircles and similarly protects the spindle 87 and the adjacent end of the thermostat 86 from moisture.

Suitably mounted relative to the housing 82 is a valve body 97 having a plunger 98 axially movable therethrough, and formed around the latter intermediately of its length is an annular passage 99. Extending through opposite sides of the body 97 are aligned openings into one of which a suction pipe 100 extends, and terminating in the opposite opening is a pipe 101 the other end of which is connected to the cylinder 88, so that when suction is exerted (by suitable means not shown) through the pipe 100, and the latter is in communication with the pipe 101 through the annular passage 99, the piston 89 is moved downwardly in the cylinder 88 and pushes the valve 85 off its seat. Projecting laterally from the expansible end of the thermostat 86 is a plate 102 against which a nut 103 on a threaded extremity of the plunger 98 is retained by a spring 104 extending around the said plunger between the body 97 and the said nut.

When the expansible end of the thermostat 86 is fully extended the height of the plate 102 above the body 97 is usually such that the annular passage 99 is largely, but not completely, above and out of registry with the pipes 100 and 101 so that at that time the two pipes are still connected by and through the said passage. At that time, however, the connected arcs in the upper portions of the pipes 100 and 101 are of such small cross sectional area that only a negligible amount of negative pressure then passes into the cylinder 88. This negligible amount is entirely too small to have any practical effect and merely leaks away. The reason for permitting this slight pressure flow when the thermostat is full expanded is to insure a flow sufficient to be effective after less vertical movement of the plunger 89, because, as the pipes 100 and 101 are round, the area of the connected arcs is very small when their vertical depth is, say 1/8" but many times greater when the vertical depth is 1/4". Consequently, by having small connected arcs at the tops of the pipes in the first place less downward movement or contraction of the thermostat is necessary before an effective flow of negative pressure passes into the cylinder 88. Consequently, as long as the thermostat is partly or wholly extended, pressure tending to open the valve 85 is exerted by the piston 89, and so long as the temperature of the air by which the thermostat is influenced remains substantially at the critical temperature the valve moves slowly on and off its seat because, though at or about critical temperature the suction exerted through the pipes 100 and 101 to move the plunger 93 downward is substantially balanced by upward pressure exerted by the thermostat 85, when the engine is in operation there is substantially continuous variation in the negative pressure exerted in the intake manifold (to which the pipe 100 is connected) and consequently the valve 85 opens and closes, or tends to do so, at frequent intervals. In the operation of an automobile there are many factors other than variation in throttle opening which vary the intake manifold pressure such as wind, variation in grade, surface of the road, increase or decrease of speed, turning of the vehicle and the like, so that under actual driving conditions changes in manifold pressure are so frequent as to be almost continuous. Since the actuating means (piston 89) for the valve 85 is subjected to these substantially continuous variations in negative pressure when the thermostat is at critical temperature, it acts as a biasing force against the thermostat tending to open the valve and to keep the thermostat live, thus preventing sluggishness of movement of the latter. Naturally if the temperature of the air by which the thermostat is influenced materially exceeds the critical temperature the valve remains closed because of the greater force exerted by the expanded thermostat, and as the temperature of the influencing air drops below the critical temperature the valve opens. It will, however, be noted that prior to the complete opening of the valve 85 the movement of the thermostat is such that the annular passage 99 is below and out of registry with the pipes 100 and 101 so that the piston 89 is only actuated when the valve 85 is shut or partly shut.

The spring 94 of course tends to move the thermostat to its contracted position and the valve 85 off its seat, however the action of the spring alone cannot be relied upon to cause immediate opening of the valve and it is found in practice that the valve is rendered much more sensitive by the inclusion of the piston 89 and the actuating means therefor as above set forth.

While in the foregoing the preferred embodiment of the invention has been described and shown, it is understood that alterations and modifications may be made thereto provided they fall within the scope of the appended claim.

What I claim is:

A thermostatic valve including an inlet and an outlet and a passage therein connecting the former with the latter, an annular seat in the valve around the passage intermediately of its length, a thermostat having an expansible extremity, a spindle extending from said extremity, a valve secured around the spindle intermediately of its length adapted to bear on said seat and close the passage, a cylinder having a piston therein, said piston being in vertical alignment with and adapted to exert a downward pressure upon the extremity of the spindle remote from the thermostat, a pipe opening into said cylinder below said piston, said pipe and cylinder being subjected to varying negative internal pressures which cause the piston and spindle to oppose expansion movement of the thermostat, whereby at the critical temperature of the thermostat the valve is intermittently opened and closed, a control valve connected in said negative pressure pipe, and means connecting the control valve with the expansible extremity of the thermostat whereby the said control valve is moved from closed position when the thermostat is fully contracted through an open position to a nearly closed position when the thermostat is expanded and at a critical temperature, the said control valve thereby variably restricting the pipe to control the effect of the varying negative pressure in the pipe on the piston.

EDMUND E. HANS.

REFERENCES CITED

The following references are of record in the file of this patent:

UNITED STATES PATENTS

| Number | Name | Date |
|---|---|---|
| 554,398 | Powers | Feb. 11, 1896 |
| 1,162,170 | Johnson | Nov. 30, 1915 |
| 1,846,698 | Trane | Feb. 23, 1932 |
| 1,897,857 | Otto et al. | Feb. 14, 1933 |
| 1,957,289 | Purpura | May 1, 1934 |
| 2,237,732 | Giesler | Apr. 8, 1941 |
| 2,308,165 | Fields | Jan. 12, 1943 |
| 2,353,692 | Cunningham | July 18, 1944 |